United States Patent [19]

Haas

[11] Patent Number: 5,669,419

[45] Date of Patent: Sep. 23, 1997

[54] APPARATUS FOR THE MEASUREMENT AND CONTROL OF GAS FLOW

[75] Inventor: Jon H. Haas, Warrington, Pa.

[73] Assignee: Keystone Machine and Tool Co., Harleysville, Pa.

[21] Appl. No.: 678,094

[22] Filed: Jul. 11, 1996

[51] Int. Cl.[6] .................................................. F16K 21/00
[52] U.S. Cl. ...................... 137/895; 137/907; 137/486; 137/487.5; 137/552; 137/557; 261/DIG. 75; 261/64.4
[58] Field of Search .................................. 137/486, 907, 137/893, 895, 487.5, 552, 557, 269; 261/DIG. 75, 64.4

[56] References Cited

U.S. PATENT DOCUMENTS

| | | |
|---|---|---|
| 2,707,480 | 5/1955 | Klosse . |
| 3,220,430 | 11/1965 | Haskett . |
| 3,689,237 | 9/1972 | Stark et al. ............................... 137/893 |
| 4,259,935 | 4/1981 | Watanabe ................................. 137/895 |
| 4,820,408 | 4/1989 | Sandig . |
| 4,913,771 | 4/1990 | McIntyre ................................. 137/895 |
| 5,152,309 | 10/1992 | Twerdochlib ............................ 137/486 |
| 5,159,951 | 11/1992 | Ono ........................................... 137/486 |
| 5,207,148 | 5/1993 | Anderson et al. ....................... 137/893 |
| 5,320,128 | 6/1994 | Talbert .................................... 137/907 |
| 5,464,038 | 11/1995 | Kruto ....................................... 137/486 |

Primary Examiner—Denise L. Ferensic
Assistant Examiner—Ramyar M. Farid
Attorney, Agent, or Firm—Edmund M. Jaskiewicz

[57] ABSTRACT

An electronic gas regulator is connected to a gas cylinder or other vessel to automatically measure and control the flow of gas to a desired application. Control and set up is accomplished through microprocessor based electronics, switches, sensors, encoders, indicators and electronic numeric display. Sensors, microprocessors and other electronics are thus provided in a single common apparatus to monitor and accurately dispense gas for a predetermined operation.

5 Claims, 8 Drawing Sheets

5,669,419

APPARATUS FOR THE MEASUREMENT AND CONTROL OF GAS FLOW

FIELD OF THE INVENTION

The present invention relates to the measurement and control of gas flow originating from a source of gas under pressure, more particularly, to an apparatus for the measurement and control of such gas flow utilizing sensors, microprocessors and other electronic devices to monitor and accurately dispense gas for a predetermined application.

BACKGROUND OF THE INVENTION

The process of dispensing gases for water disinfection as well as for other processes has been largely a mechanical procedure based upon the operator's ability to set the gas flow measurement device by the human eye. Although such a mechanical procedure has had wide application and has been considered suitable for many years, it has long been desired to increase significantly the accuracy and safety of such control systems. In fact, more accurate and safer control systems became required with the dispensing of a number of different kinds of gases into different liquid process systems some of which were highly dependent upon the introduction of precise and accurate quantities of gas. Known prior art mechanical systems had been extensively modified with various forms of add-on controls but they still suffered from the deficiencies of the early technology and inherent design limitations. It has been recognized that the previous mechanical control systems had virtually reached the apex of their utility and that a different approach to the accurate and safe dispensing of gases into a liquid process system was necessary.

SUMMARY OF THE INVENTION

It is therefore the principal object of the present invention to provide a novel and improved apparatus for the measurement and control of gas flow.

It is another object of the present invention to provide an apparatus for the measurement and control of gas flow utilizing modem sensor technologies, digitally controlled motor and a microprocessor to create a safer and more accurate device for dispensing disinfecting and other process gases.

It is a further object of the present invention to provide such an apparatus which is simple in construction, reliable in operation and which requires a minimum of maintenance.

According to one aspect of the present invention, an apparatus for the measurement and control of gas flow may comprise a housing having a chamber and an inlet valve in the chamber for connection to a source of gas under pressure. A piston or diaphragm is reciprocable within the chamber and is subjected to a vacuum to actuate the piston into engagement with the inlet valve to open the inlet valve. A gas flow metering and sensing assembly is provided in the housing and has a flow passage there through which has an inlet connected to the chamber and an outlet. Mounted within the flow passage is a metering valve and a gas flow sensing means downstream of the metering valve. A digital controller motor is connected to the metering valve and is responsive to the gas flow sensing means to regulate the position of the metering valve and thereby vary the gas flow them through to the outlet to be dispensed in a process.

An ejector is mounted in the piping of the liquid process system and provides a vacuum which is supplied to the chamber to actuate the system. The ejector is provided with removable jet and nozzle inserts so that the inserts can be replaced by other inserts to vary the gas capacity produced by the jet flow of liquid there through.

The apparatus is also provided with an integrated programmable operator control which incorporates improved process control and warning indicators to provide for a more reliable system as compared to known prior are mechanical systems.

BRIEF DESCRIPTION OF THE DRAWING

Other objects and advantages of the present invention will be apparent upon reference to the accompanying description and the following drawings, which are exemplary, wherein.

DESCRIPTION OF THE PREFERRED EMBODIMENTS

Proceeding next to the drawings wherein like reference symbols indicate the same parts throughout the various views, a specific embodiment and modifications of the present invention will be described in detail.

Figure 1:
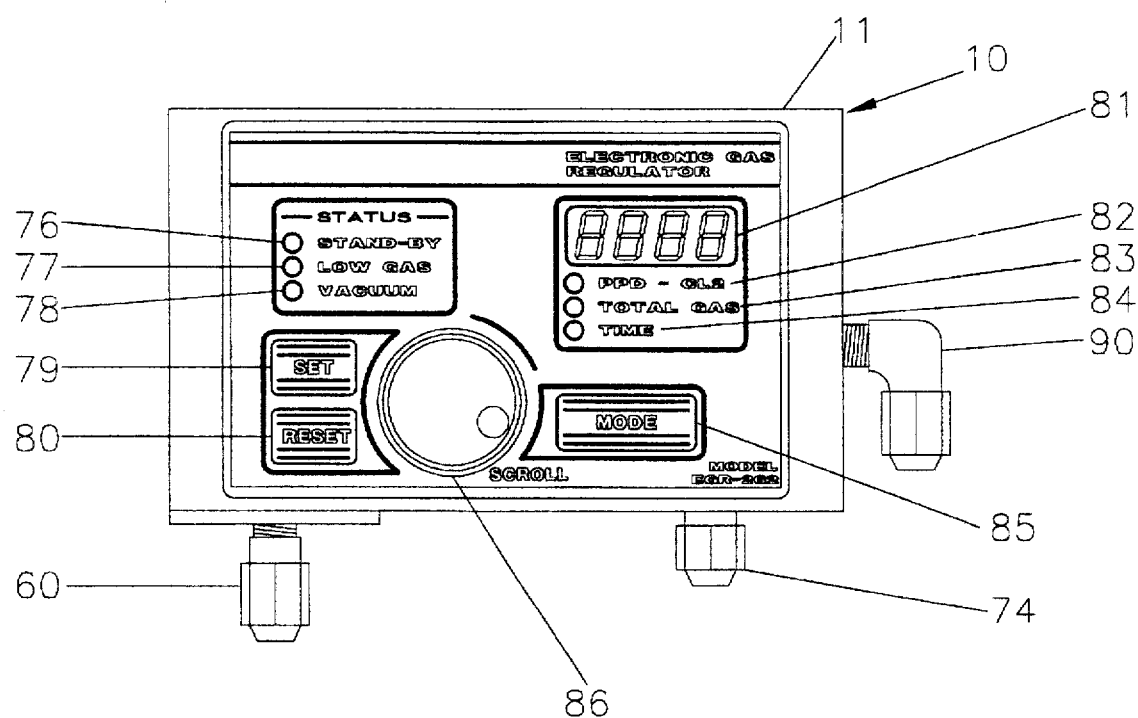
FIG. 1 is a front elevational view of the electronic gas regulator according to the present invention.
Figure 2:
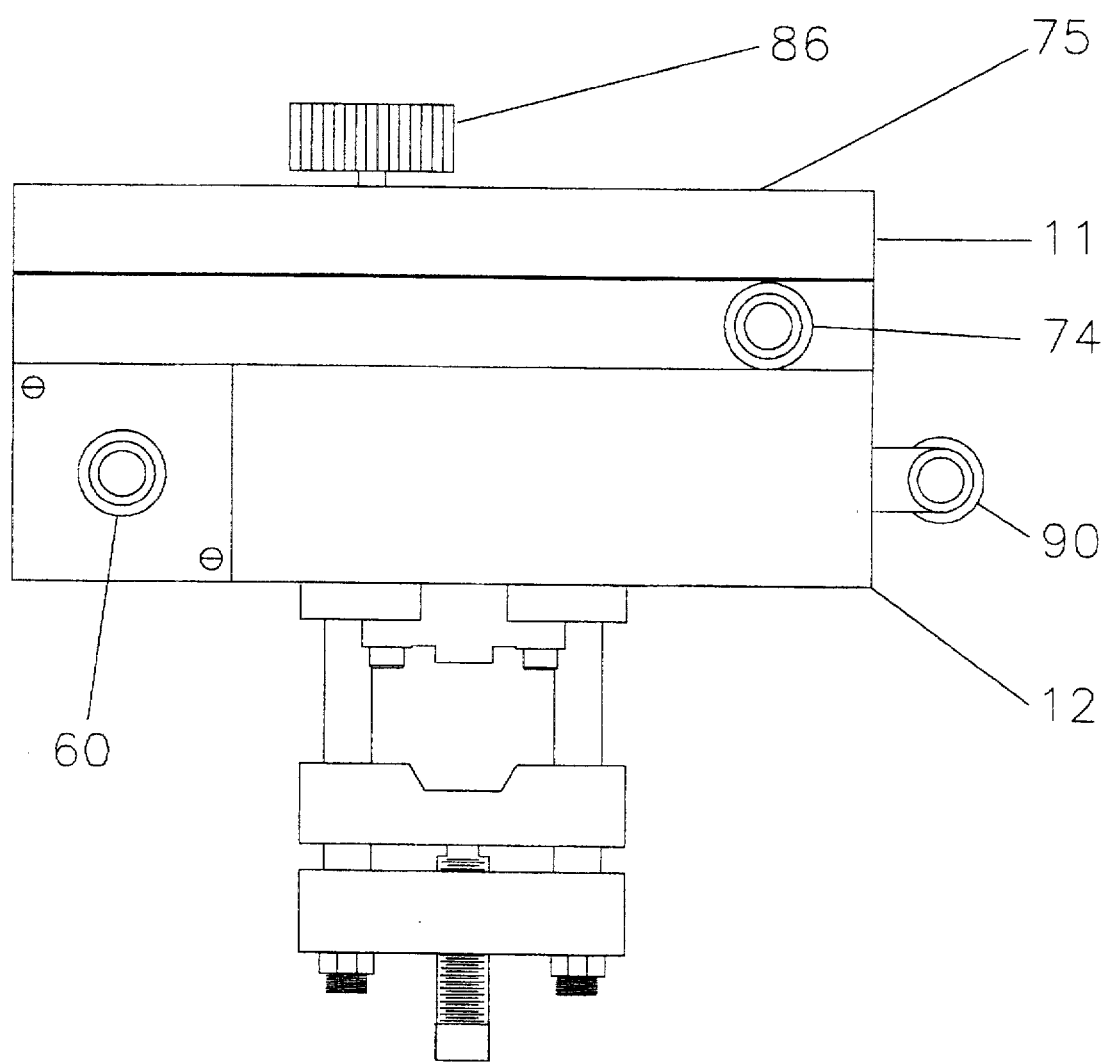
FIG. 2 is a side elevational view of the regulator shown in FIG. 1.

The electronic gas regulator according to the present invention is indicated generally at 10 in FIG. 1 and comprises an electronic enclosure 11 and a main housing 12. The main housing 12 has a cylindrical chamber 13 therein and a piston or diaphragm 14 in reciprocable mounted in the chamber 13. On the lower face of the piston 14 is a projection 15 which is engageable with an actuator 16 of an inlet valve assembly indicated generally at 17. The actuator is threaded onto the end of a valve member 18 which has a bevel surface 19 engageable with a valve seat 20. A spring 21 biases the actuator member upwardly so as to maintain the valve member in the closed position as seen in FIG. 1. Thus, when the piston 14 moves downwardly to engage the valve actuator, the valve member will be open.

The inlet valve assembly 17 has an inlet opening 22 which is connected to a suitable outlet of a conventional gas cylinder which contains the gas under pressure which is to be used in a process in which regulation of the gas flow is desirable. In this particular embodiment, the cylinder contains Chlorine since this gas is to be used in a process for the disinfection of water.

The gas regulator 10 is mounted on the gas cylinder by means of a saddle clamp 23 mounted on a pair of clamp studs 24 attached to the regulator. A clamp 25 is mounted on the ends of the clamp studs as a clamp screw 26 therein which acts against the saddle clamp 23 to secure the gas regulator in position on the gas cylinder.

The cylinder 13 in the main housing 12 is connected to a vacuum source through an outlet housing 49.

Figure 4:
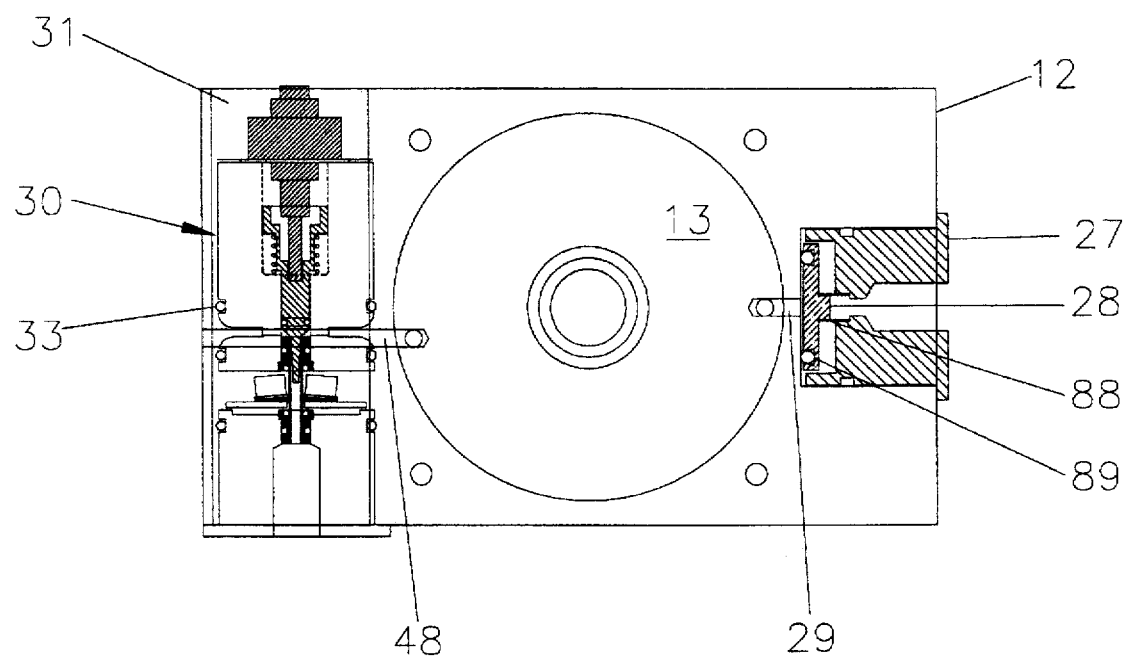
FIG. 4 is a section view taken along the line IV—IV in FIG. 3.

A gas flow metering and sensing assembly 30 is located on the left had side of the main housing 12 as viewed in FIG. 4 and is indicated generally at 30. This assembly 30 is shown in greater scale and detail in FIG. 5. This metering and sensing assembly 30 is inserted within a cylindrical passage 31 formed in the main body 12 as shown.

Figure 5:
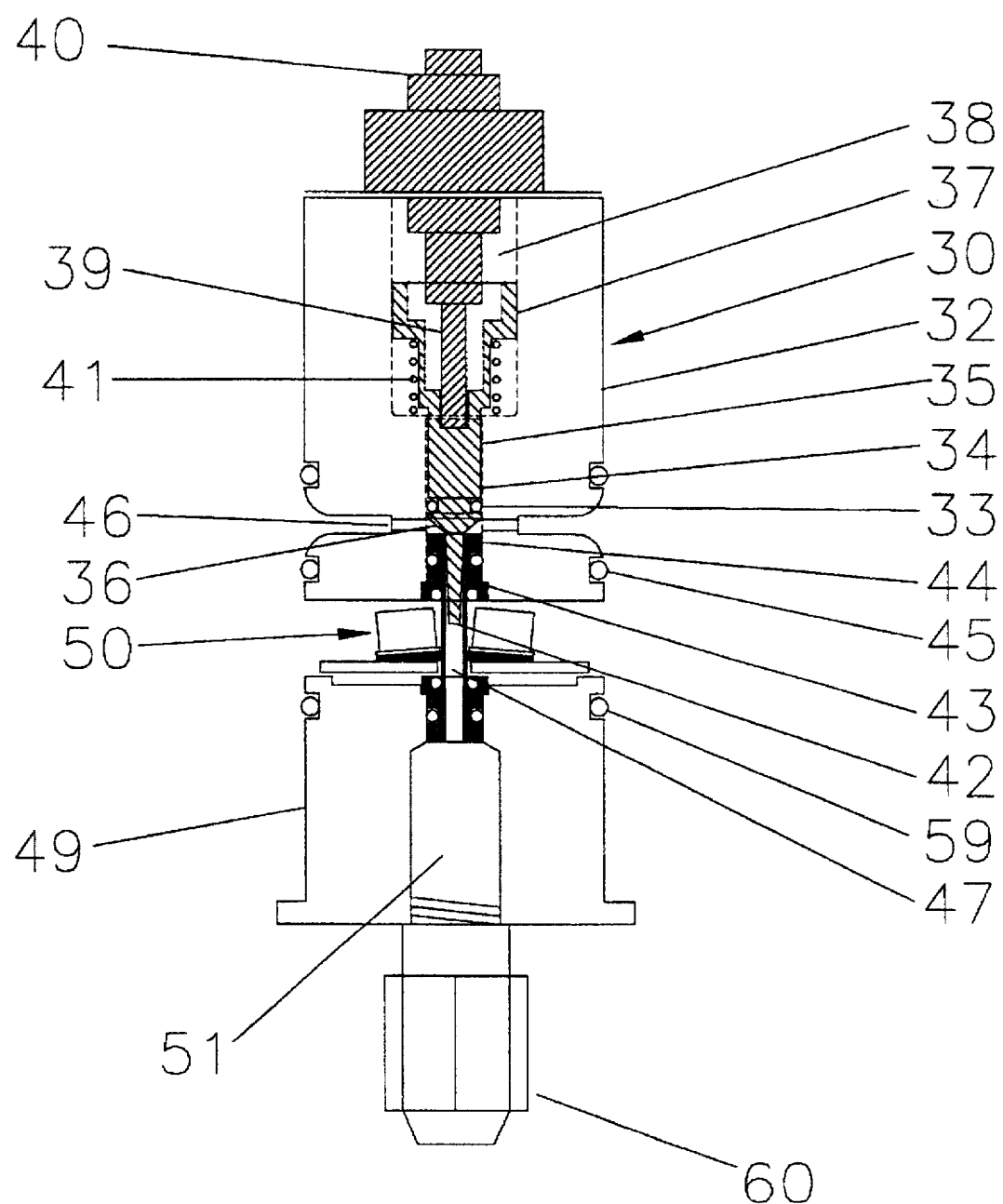
FIG. 5 is an enlarged portion of the section of FIG. 4 and showing the flow meter valve/gas flow sensor assembly.

The meter and sensor assembly 30 comprises a cylindrical manifold 32 and has an O-ring 33 seated in a peripheral groove as shown in FIG. 5. Within the lower portion of the manifold there is an axial passage 34 in which is slideably positioned a valve body 35 of a meter valve 36. Extending upwardly from the valve body 35 is a shoulder portion 37 which is slidably received within a larger diameter axial chamber 38. The shoulder portion 37 is hollow and receives a driving shaft or member 39 extending axially from a linear motor 40 which is mounted on the end of the manifold 32. A return spring 41 biases the metering valve upwardly into an open position and movement of the drive member 39 urges the metering valve downwardly as shown in FIG. 5.

The metering valve has a tapering axial valve member 42 which is received within an axial passage 43 formed in a orifice insert 44 in the manifold and having an O-ring 45 therein seated in a peripheral groove therein. The gas then passes through radial holes 46 in the manifold 32 after entering through a passage 48 leading from the piston chamber 13 and shown in FIG. 4.

Figure 6:
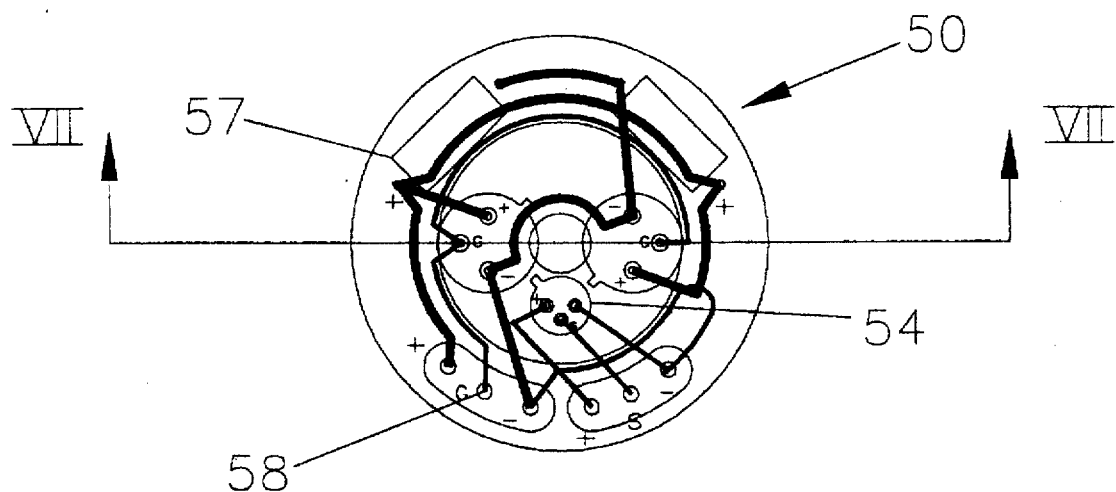
FIG. 6 is a top plan view of the gas sensor assembly shown in FIG. 5.
Figure 7:
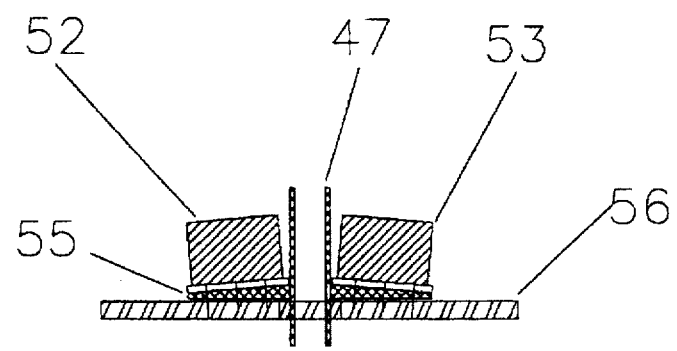
FIG. 7 is a sectional view taken along the line VII—VII in FIG. 6.

A tubular member 47 extends from the valve passage to a outlet port 51 in an outlet housing 49. Surrounding the passage 47 is a gas flow sensor 50 shown greater detail in FIGS. 6 and 7.

The outlet housing 49 has an outlet port 51 which has a fitting 60 and is connected to the ejector for the addition of gas to the water stream into which gas is to be mixed.

The gas sensor 50 is comprised of solid state heaters 52 and 53, a solid state temperature sensor 54 and the gas flow tube 47. There is a heat spreader disk 55 mounted to the gas flow tube 47 and connected to a printed circuit board 56 upon which is also mounted a capacitor 57 and a wire connection location 58.

As may be seen in FIG. 5, the sensor assembly 50 is positioned on an end of the outlet housing 49 such that the gas flow through 47 connects with the outlet port 51. The outer peripheral surface of the outlet housing 49 is also provided with a sealing O-ring 59 seated in a peripheral groove.

The entire meter and sensing assembly 30 is seated within the chamber 31 in the main housing to receive gas through the passage 48.

Figure 3:
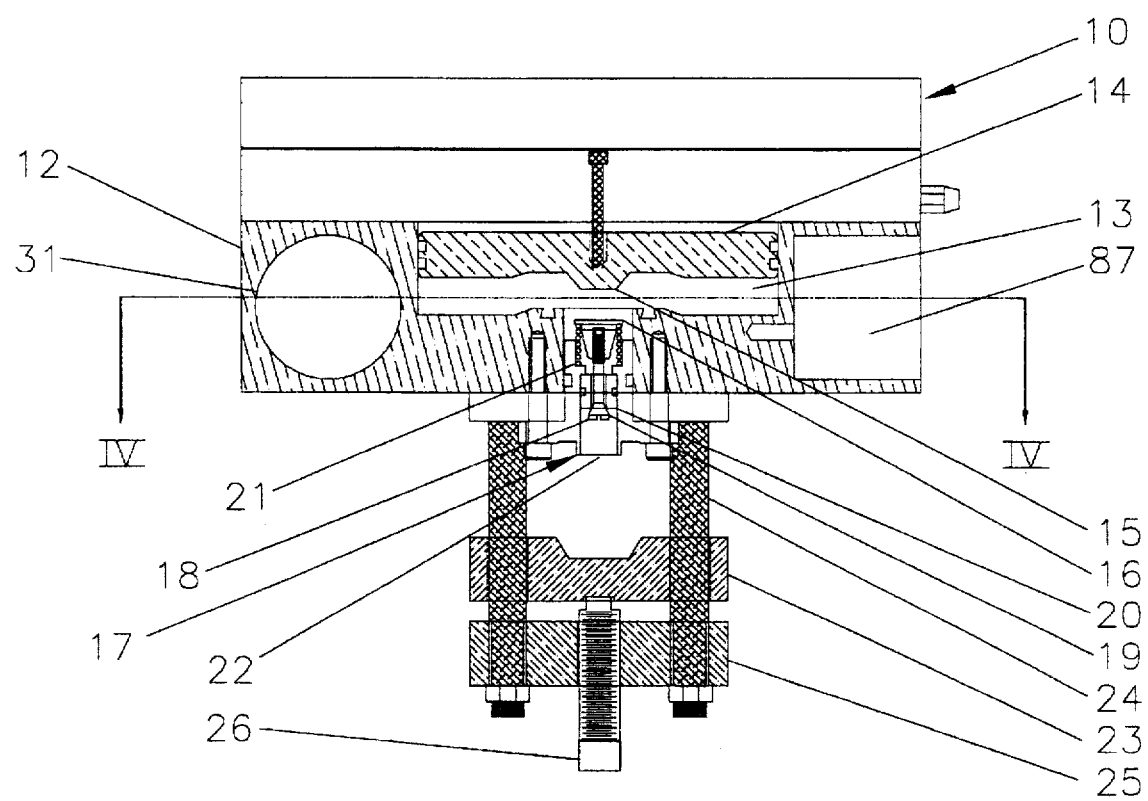
FIG. 3 is a side elevational view similar to FIG. 2 but with the main housing portion of the regulator being shown in section and a portion of the electronics enclosure being cut away to show the magnetic sensor extending upwardly from the piston.

A pressure relief valve housing 27 is located in cylindrical chamber 87 formed in the main housing 12 as shown in FIG. 3. Located within the pressure relief valve housing is a check valve member 28 with a seal O-ring 89 seated in a groove and spring 88. This pressure relief valve vents excess gas in such cases as when the inlet valve does not close entirely due to dirt or particles carried by the gas as commonly known in this field. This stops any high pressures from increasing beyond the safe level for the housing 12. A passage way 29 in FIG. 4 connects the pressure relief valve cylindrical chamber 87 to the cylindrical chamber 13 in the housing 12.

After the inlet valve closes and small amounts of gas leak by, the pressure increases until check valve member 28 moves against spring 88 and lifts off of passage 29. As check valve member 28 moves it carries O-ring seal 89 which allows excess pressure to escape into the housing with fitting 90. The gas then travels out of fitting 90 connected to piping to a safe area.

Figure 8:
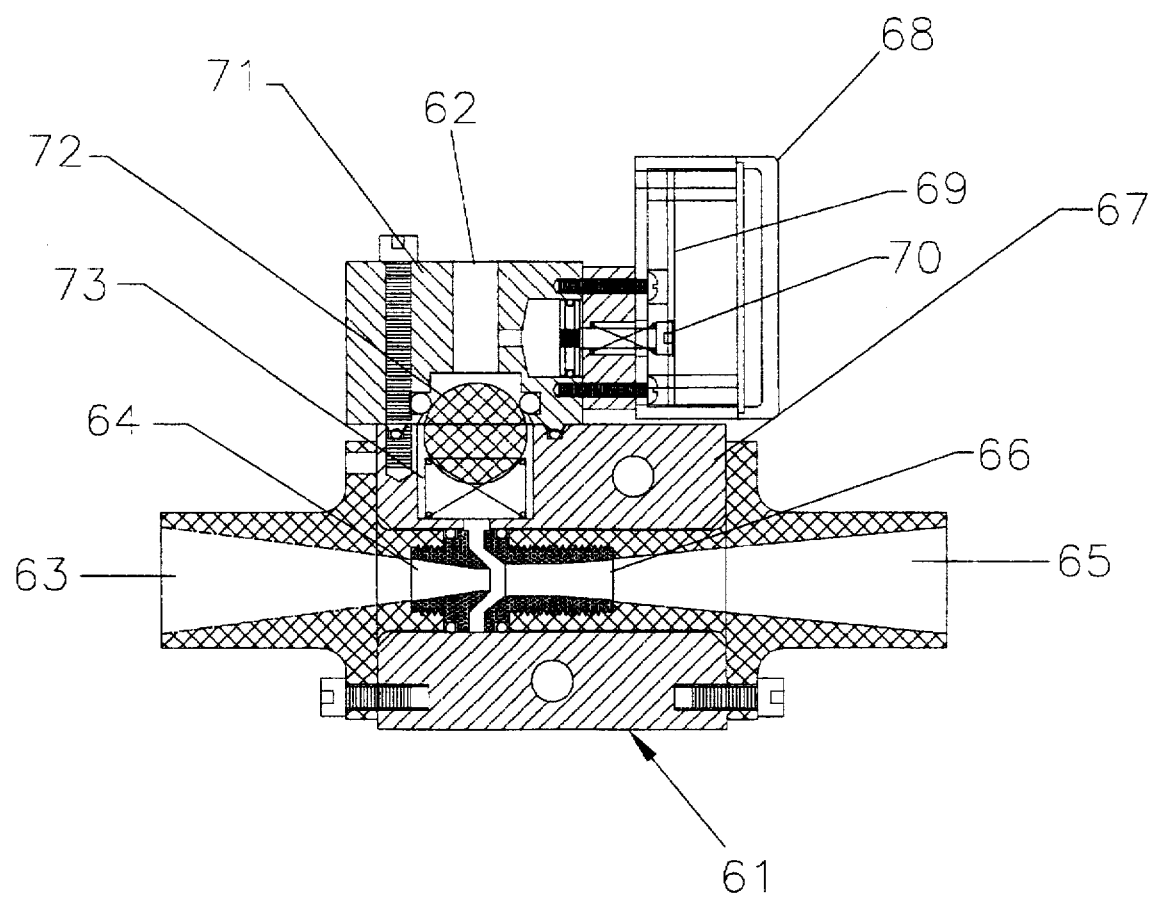
FIG. 8 is a longitudinal sectional view of the ejector used with the electronic gas regulator of the present invention.

The outlet fitting 60 shown in FIG. 5 is connected to an ejector which generates the necessary vacuum from the water supply to operate the electronic gas regulator of the present invention. Such an ejector is indicated generally at 61 in FIG. 8. The ejector has an inlet 62 which is connected to the outlet fitting 60 in the electronic gas regulator. The ejector comprises a water inlet jet 63 which is provided with a jet insert 64. The water then continues to an outlet nozzle 65 which is similarly provided with a nozzle insert 66. The gap between the insert 64 and 66 can be modified or adjusted as may be desired according to different conditions merely by interchanging other jet inserts or nozzle inserts. The water inlet 63 and the outlet nozzle 65 are readily detachable from the ejector housing 67 since they are merely secured by screws as shown in FIG. 8.

An electronics enclosure 68 which contains a circuit board 69 and a vacuum sensor 70 is secured to a check valve housing 71 which contains the vacuum inlet 62 A ball check valve 72 is biased by a spring 73 within the vacuum passage leading to the jet formed between the inserts.

Figure 9:
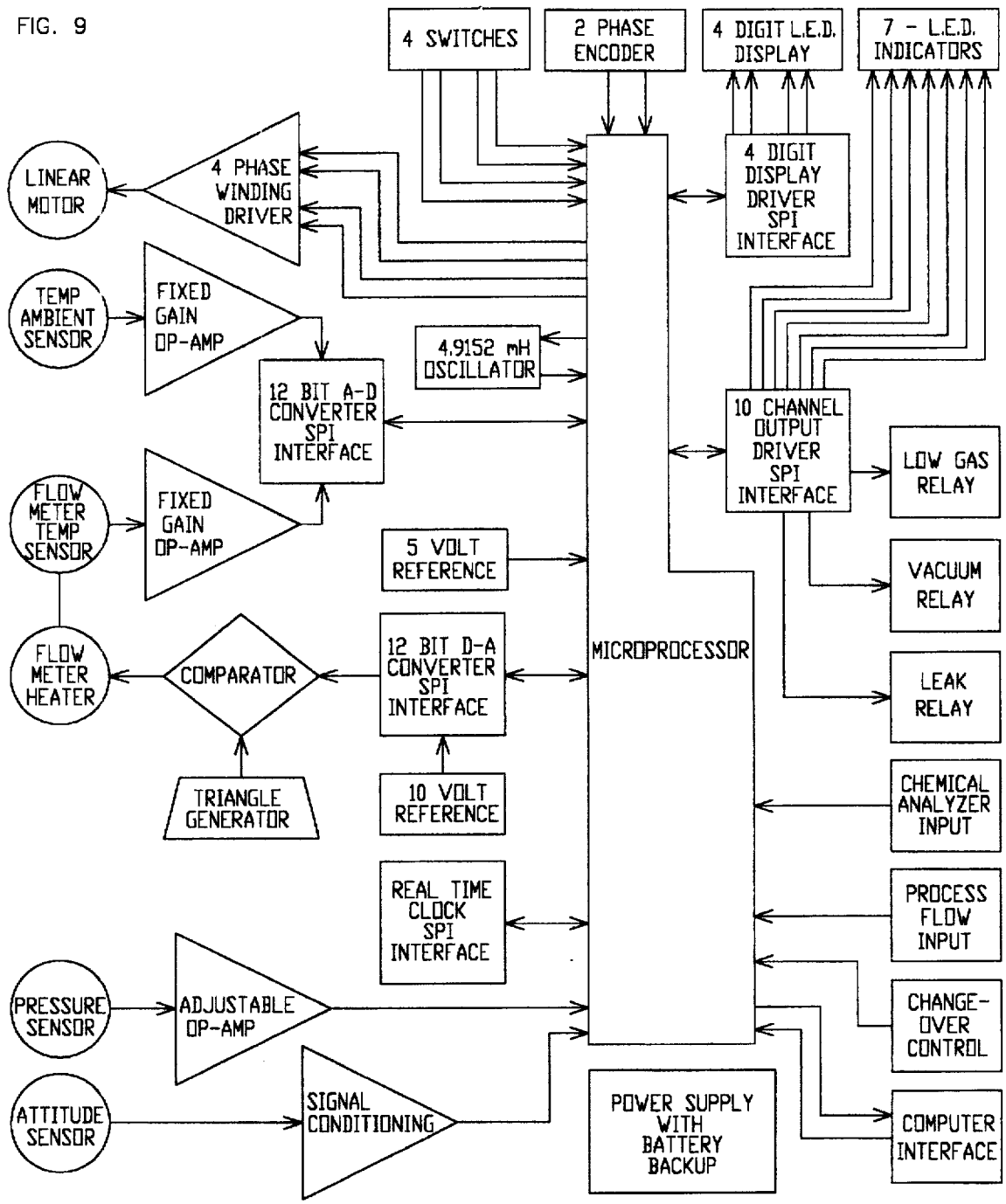
FIG. 9 is a schematic electrical diagram of the circuitry in the electronic enclosure.

The electronics enclosure 11 has an electrical cable outlet 74 and houses a control circuitry disclosed in FIG. 9. This circuitry contains internal sensing devices which allow for the monitoring of gas flow, vacuum and cylinder attitude to provide accurate and consistent levels of chlorine as desired. The controls for the gas regulator of the present invention are mounted so as to be readily accessible on the top face 75 of the electronics enclosure 11.

The controls include a stand-by indicator 76 which indicates that the gas regulator is waiting for a signal to start gas flow for automatic switch over. There is a low gas indicator 77 which indicates when the low gas set point has been reached. A vacuum indicator 78 indicates the loss of vacuum for any reason. A set switch 79 enters control variables for operation and there is a reset switch 80 to acknowledge alarms. A numeric four digit display 81 indicates control parameters. A pounds per day indicator 82 signifies the display is in Pounds Per Day mode, a total gas indicator 83 signifies that the display indicates the total pounds of gas or chlorine consumed from the start and a time indicator 84 signifies that the display is in the 24 hour clock mode. A mode switch 85 selects the parameter to be displayed and there is a scroll control 86 to increase or decrease control variables.

The electronic circuitry thus provides that all operating parameters are set by electronic controls and that there are indicators for accurate levels. The gas regulator is immune to changes in hydraulic conditions and maintains constant chlorine levels while in operation. The circuit further comprises a cylinder tip-over detection and automatic shut off in the event that the attitude of the cylinder is changed by accidental or other reasons.

As indicted above, a particular application for the gas regulator of the present invention is to dispense accurate and precise amounts of chlorine into water. The ejector 61 as described above is connected in the piping of the processed water so that the flow of water through the ejector creates a vacuum for the operation of the system.

In operation, the apparatus is programmed by the electronic switches 79 and 80 and numeric displays at 81 with he process operation parameters. The operator enters the necessary flow rate and other adjustable features to the desired value. The microprocessor in the electronic enclosure then make the adjustment as required to maintain the pre-programmed parameter. The apparatus requires vacuum from the ejector operation to move the regulation piston or diaphragm 14 to open the inlet valve assembly 17. The inlet valve is normally closed by a spring loaded tapered screw 20. The screw is seated on the inlet valve seat to maintain a gas type seal. When the piston 14 presses on the top of the valve 16 and unseats the tapered screw, gas is allowed to leave the cylinder. Gas travels from the cylinder and enters the main housing 12. The gas then moves from the cylinder 13, through the passage 48 through an array of ports 46 in the radial manifold 33 and the flow is controlled by the position of the metering valve 36. The metering valve 36 is operated by the digitally controlled motor 40. The motor 40 precedes the proper electrical control signal from the microprocessor to move the metering valve 36 open or closed depending on the requirements of the program or the gas flow sensor 50.

The gas flow sensor 50 detects the flow of gas and sends a signal to the associated electronic and microprocessor. The rate of gas flow is measured by the sensor and compared to the setting initially made by the operator. The microprocessor adjusts the motor 40 controlling the valve to maintain the proper gas flow level. The flow of gas then moves to the outlet housing 49 and from the outlet port 51 through tubing to the ejector inlet 62 and to the operator's application.

Additional sensors and indicators 76,77 and 78 are provided to alert the operator of events that could disrupt the process of delivering to application. A sensor connected to a piston or diaphragm is used to monitor vacuum levels or if the cylinder is empty. Warning levels can be set the operator in the microprocessor program and indicted on the control panel. Also,relay contacts are provided for the operator's remote control panel that the gas cylinder is empty, vacuum has stopped, or an unsafe condition exist. An additional sensor is used to sense vibration or the attitude of the cylinder. If the gas cylinder is accidentally tipped over or earthquake conditions exist,the sensor sends signals to the associated electronics and microprocessor which will then immediately operate the motorized valve and close the valve to shut off the flow of gas. This condition will activate the unsafe condition relay.

Modifications of the invention include electrical interfaces to allow computers to be connected to the electronics enclosure 11 to monitor and over-ride control parameters as a remote control function in an operators control room. This allows individual or multiple electronic gas regulators to be monitored and controlled at the same time. Also, there may be provided is internal connections to allow change over from one cylinder to another automatically as cylinders of gas are emptied.

The outlets of multiple electronic gas regulators can be piped together to a common vacuum source and electrical cables connect each internal control electronics. Signals from electronic gas regulators activate consecutively additional electronic gas regulators to allow the empty cylinders to be replaced. Other electronic interfaces allow gas sensing devices to monitor ambient air for gas leaks and close the meter valve as a safety action. These gas sensing devices can be external or internal to the electronics of the electronic gas regulator. To support electronic gas regulator during power outages, battery back-up electrical power is integrated within the power supply and is automatically activated when an outage occurs. This will maintain full operation for several hours until power is restored.

It will be understood that this invention is susceptible to modification in order to adapt it to different usages and conditions, and accordingly, it is desired to comprehend such modifications within this invention as may fall within the scope of the appended claims.

What is claimed is:

1. An apparatus for the measurement and control of gas flow into a liquid process system comprising a housing having a chamber therein and an inlet valve in said chamber for connection to a source of gas under pressure, a member reciprocable within said chamber and engageable with said inlet valve, means for subjecting said reciprocable member to a vacuum to actuate said member to open said inlet valve, a gas flow metering and sensing assembly in said housing having a flow passage therethrough and having an inlet connected to said chamber and further having an outlet, said flow passage having therein a metering valve at said inlet and a gas flow sensing means downstream of said metering valve, and a digital controller motor connected to said metering valve and responsive to said gas flow sensing means to regulate the position of said metering valve and thereby vary the gas flow therethrough to said outlet into a liquid process system, programmable electronic controller means on said housing and connected to said motor for regulating gas flow, said controller further comprises indicator means responsive to loss of vacuum, level of gas in the supply source and tilt detection of the gas source.

2. An apparatus as claimed in claim 1 wherein said gas flow metering and sensing assembly comprises a manifold and said metering valve being disposed in said manifold, said controller motor being mounted on said manifold.

3. An apparatus as claimed in claim 1 wherein said controller further comprises second indicator means thereon showing total gas flow and quantity of gas flow per unit time.

4. An apparatus as claimed in claim 1 and further comprising an ejector connected to said apparatus to supply a vacuum thereto, said ejector being mounted in a process liquid piping system, and a vacuum line connecting from said ejector to said outlet.

5. An apparatus as claimed in claim 4 wherein said ejector comprises a removable jet insert and a removable nozzle insert each interchangeable with one of a plurality of other inserts to vary the magnitude of the vacuum produced by the liquid flowing through said jets.

* * * * *